United States Patent [19]
Chen et al.

[11] 3,906,263
[45] Sept. 16, 1975

[54] VIBRATOR MOTOR IN HAND-HELD ELECTRIC APPLIANCE

[75] Inventors: Evan N. Chen, Fairfield, Conn.;
Hugh B. Matthews, Acton, Mass.

[73] Assignee: Sperry Rand Corporation, Bridgeport, Conn.

[22] Filed: May 23, 1974

[21] Appl. No.: 472,539

[52] U.S. Cl. .................. 310/29; 310/38; 30/45; 30/43.92
[51] Int. Cl.² .................. H02K 33/00
[58] Field of Search .......... 30/45, 43.1, 43.7, 43.9, 30/43.92; 310/29, 36–39, 50, 47, 21, 23

[56] References Cited
UNITED STATES PATENTS

| | | | |
|---|---|---|---|
| 2,565,697 | 8/1951 | Odstrcil | 310/29 |
| 3,296,468 | 1/1967 | Townshend | 310/29 |
| 3,679,921 | 7/1972 | Jank | 310/38 X |

*Primary Examiner*—Donovan F. Duggan
*Attorney, Agent, or Firm*—Charles R. Miranda

[57] ABSTRACT

A portable hand-held electrical appliance such as an electric shaver which includes a vibratory motor in a casing, the motor including an armature assembly and a stator assembly, both suspended for movement about a common pivot axis. The stator is spaced out of contact with the casing walls to minimize undesirable vibrations being transmitted through the walls of the casing to the user's hands.

9 Claims, 4 Drawing Figures

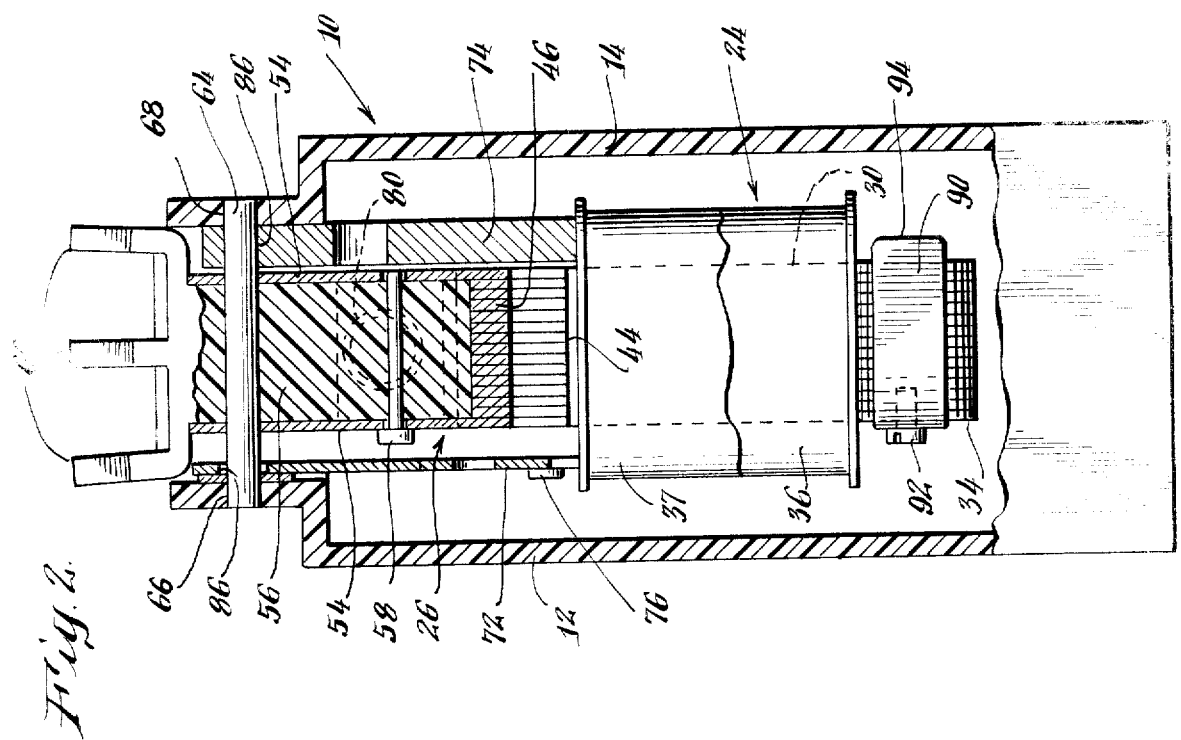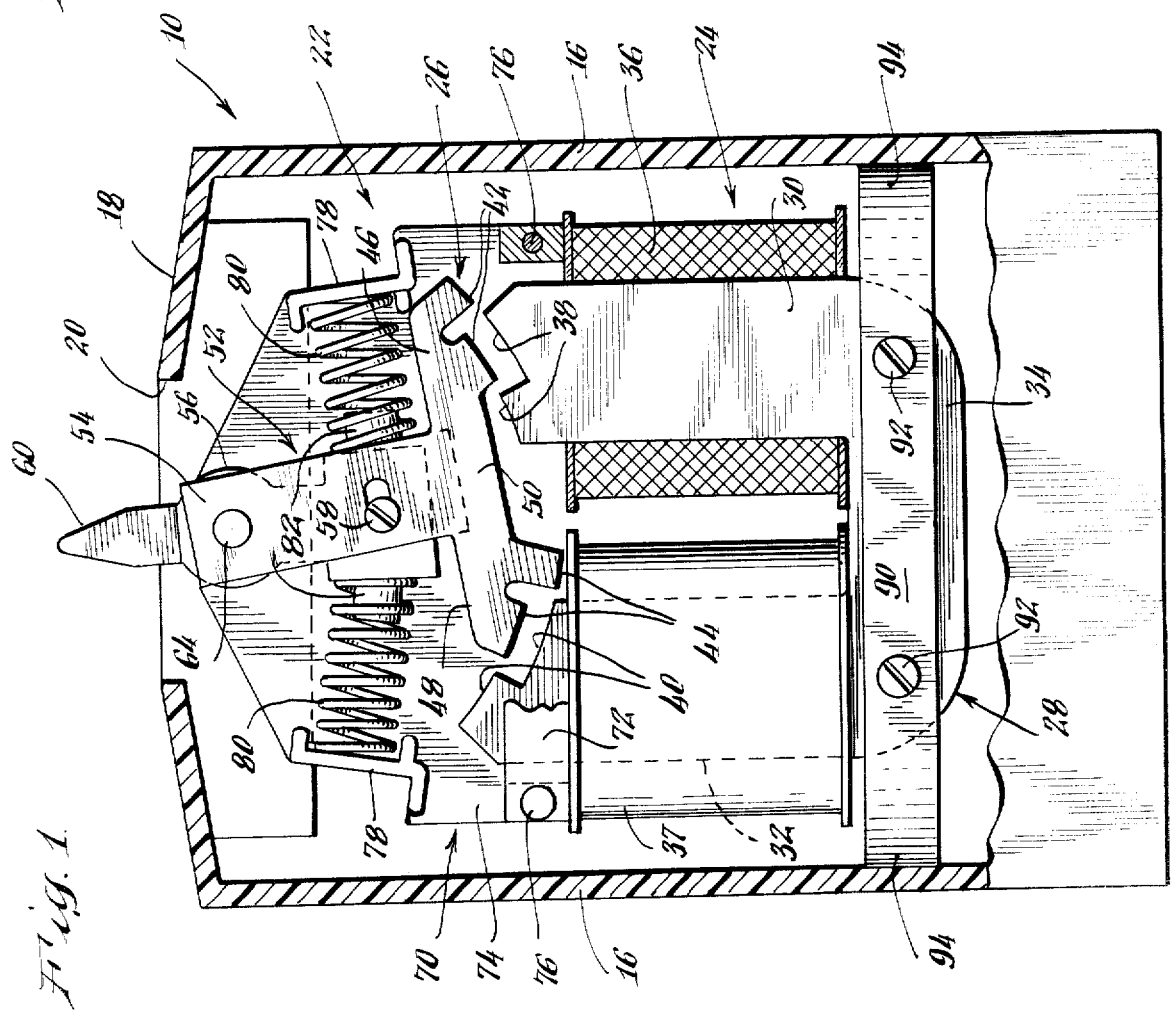

VIBRATOR MOTOR IN HAND-HELD ELECTRIC APPLIANCE

BACKGROUND OF THE INVENTION

This invention relates to portable hand-held electrical appliances, and more particularly to those appliances which utilize vibratory motors.

Vibratory motors are found in many portable hand-held electrical appliances because they are fairly rugged and efficient devices, and also inexpensive. The motor generally includes an armature assembly, which in the case of an electric shaver, drives cutter mechanism through intervening structure. The stator, or the frame carrying the stator, is generally secured to the walls of the casing as shown in U.S. Pat. No. 3,343,011. The attachment of the stator to the casing walls cause transmission of undesirable vibrations through the shaver casing to the user's hands. These vibrations arise as a result of the masses of the several parts which are moving within the shaver, and which in effect, cause unbalancing forces for which there are no measurable resonances. Obviously, if measurable resonances did exist, dampening means could be utilized to reduce the vibrations.

An analysis of the vibratory motor in an electric shaver as shown that if for purposes of study, the masses of the shaver could be simplified for consideration there are probably two masses which constitute the shaver. One is the armature system which includes the armature, the cutters and approximately half of the mass of the two centering springs. The other mass which, for sake of explanation we shall call the "body", includes the casing, the stator, and the other half of the springs inasmuch as they are more or less rigidly attached together. The armature system is complex, since the armature oscillates, the cutters move, and the springs are operating to perform their function. But, as the armature rotates through a small angle the armature system might be considered either as one mass rotating, or several masses translating parallel to each other.

If the armature system is considered to be rotating, and if its pivot were located at the system center of gravity, which it is not, the action of the motor in causing the armature system to rotate induces a pure torque (couple) reaction in the "body". This will cause the "body" to rotate in free space about the center of gravity of the entire shaver, but in the opposite sense from the armature. The amplitude of body rotation will be much smaller than that of the armature by the ratio of their respective moments of inertia. If one were to put a shaft through the "body" along this axis and grasp the shaft while the shaver was running, the hand would not sense any vibration since the body is at rest in space along this axis except for rotation.

In the shavers analyzed, the armature system in one shaver was not pivoted about its center of gravity. Instead of just having a couple, the rotating unbalance resolved itself into a couple and a force. The force caused the free body axis of rotation to move away from the center of gravity, in a direction perpendicular to the line of force application and for a distance commensurate with the relative values of the couple, the force, and the polar moment of inertia of the shaver. The axis of rotation of the shaver which was examined, actually was outside the shaver while in another shaver which was examined having a differently balanced armature system, the free body axis was inside the case but still not at the center of gravity. The armature system can be balanced by approximately locating some of the mass relative to the pivot and thus pull the free body axis of rotation back into the shaver. If desired, the free axis could be placed precisely coincident with the armature pivot. However, the effort and expense in relocating the mass and in changing the design of the motor and the manufacture of same, are considerable. In view of this, a reasonable compromise is believed warranted and that compromise is to minimally change the motor and its arrangement in the casing, and yet provide for improvement in reduction of undesirable vibrations to the user's hands.

An object of the present invention is to provide a portable electrical appliance having a novel vibratory motor arrangement which causes minimal undesirable vibrations.

Another object is to provide a portable electrical appliance having a novel vibratory motor arrangement which is suspended, within the casing, from the pivot axis of the armature assembly.

A further object is to provide a novel vibratory motor wherein means are provided to cancel unbalancing forces generated in the casing of an electrical appliance to minimize undesirable vibrations being transmitted to the hands of a user.

SUMMARY OF THE INVENTION

The present invention contemplates a portable electrical appliance which includes a novel vibratory motor suspended within the casing of the appliance. The armature of the motor pivots, or oscillates, about a pivot shaft which has its ends carried by opposite walls of the housing. The stator of the motor is carried by a frame which is suspended from and secured to the pivot shaft of the armature. The stator and frame are spaced from, and out of contact with the casing walls of the appliance and thus are free to move with respect to the casing and to the armature. In one embodiment of the invention, spring means are secured to the stator to bear lightly against casing walls to prevent contact of the stator with the casing. In a second embodiment, transfer spring means embrace the stator and have ends connected to the pivot axis to transfer unbalancing moments to the pivot, to thereby effect cancellation of opposite unbalancing forces.

The above and other objects and advantages of the present invention will appear more fully hereinafter from a consideration of the detailed description which follows taken together with the accompanying drawings wherein two embodiments of the invention are illustrated.

DESCRIPTION OF THE DRAWINGS

In the drawings:

FIG. 1 is a front elevational view, partly in section, of the portable electrical appliance which includes one embodiment of the novel vibratory motor arrangement of the present invention;

FIG. 2 is a side elevational view, in section, of the appliance of FIG. 1;

DESCRIPTION OF THE PREFERRED EMBODIMENTS

Figure 4:
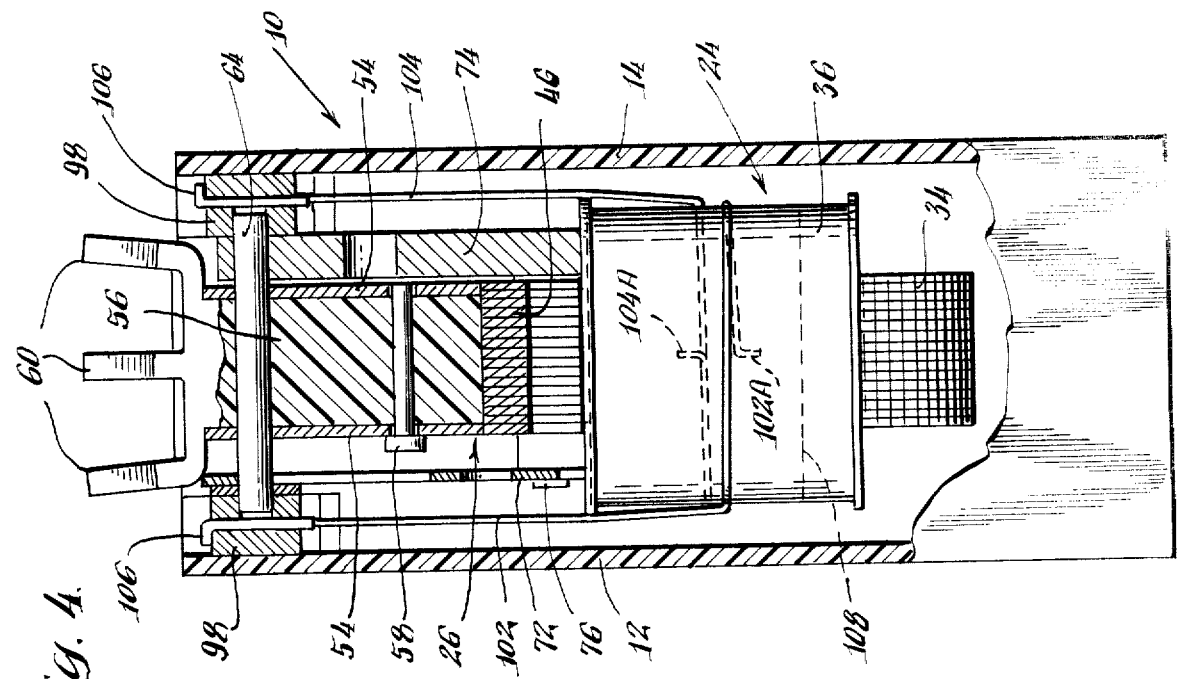
FIG. 4 is a side elevational view, in section, of the appliance of FIG. 3.

Referring now to the drawings, and more particularly to FIG. 1 hereof, the reference character 10 generally designates a casing of a portable hand-held electrical appliance, as for example, an electric shaver and includes a front wall 12 (FIG. 2), a rear wall 14 and side walls 16. An upper wall portion 18 joins the top surfaces of the walls 12, 14 and 16 and is provided with an aperture 20. A vibratory motor 22 of the present invention is disposed in casing 10 and comprises a stator assembly 24 and an armature assembly 26. Stator 24 includes a U-shaped core 28 made of suitable magnetizable material, such as laminated soft iron, or a steel alloy, or other alloy material which is easily magnetized and demagnetized. Core 28 includes a pair of legs or poles 30 and 32 and a base portion 34. Field winding coils 36 and 37 of suitable number of turns of magnetic material are provided on legs 30 and 32, respectively, of the stator and are adapted for connection to a source of supply of A.C. power (not shown) by means (not shown).

Pole faces 38 and 40 are formed at the ends of legs 30 and 32, respectively, of stator 28. Corresponding pole faces 42 and 44 are provided on a pair of poles or legs 46 and 48, respectively, of a laminated armature 50 forming part of a pivoted armature assembly 52. Armature pole faces 42 and 44 are suitably configured for electromagnetic coupling with their associated stator pole faces 38 and 40 respectfully. Armature 50 has a pair of upstanding spaced arms 54 (FIG. 2) which accommodate an oscillator 56 between the arms and the oscillator is secured for movement with the armature 50 by s threaded member 58. The upper part of oscillator 56 includes three fingers 60 which extend through aperture 20 of casing 10 to engage in driving relationship, cutter blades (not shown).

A pivot shaft 64 extends through oscillator 56 and arms 54 and has ends 66 and 68 which are carried at ends 66, 68 by front and rear walls 12 and 14, respectively. Pivot shaft 64 is press fitted to oscillator 56 to rotate therewith but the shaft is free to move at its ends 66 and 68 in walls 12 and 14.

A frame assembly 70 having front and rear plates 72 and 74 is secured to the pole legs 30 and 32 by way of fastening members 76. A pair of end retaining members 78 are provided intermediate front and rear plates 72 and 74 to accommodate the ends of centering springs 80. The other ends of springs 80 are seated on bosses 82, formed on oscillator 56. Springs 80 are designed and calibrated to position the armature assembly 52 in a rest position shown in FIG. 1 when the coil 36 is deenergized, and upon energization of the latter the springs serve to oscillate the armature in coaction with the pulsing electromagnetic field, as is well-known in the art.

The structure described to this point is more or less well-known in the art. However, instead of fastening the stator assembly 24 and frame assembly 70 to the casing walls, the present invention provides for suspending the stator and frame assemblies spaced from the casing walls as to be separated from and out of contact therewith. This is accomplished by hanging the mentioned assemblies from pivot shaft 64 by way of openings 86 formed in the upper portions of plates 72 and 74, whereby the frame and stator are rotatable or freely mounted on the shaft, in the manner of a pendulum. A flat spring 90 is secured to base portion 34 of stator core 28 by threaded members 92 and has curved ends 94, which when the motor is deenergized, lightly bear against or contact sidewalls 16.

In operation, energization of motor 22 provides for oscillation of armature assembly 26, induces a torque reaction in the stator assembly 24 and frame assembly 70 which causes the latter to move a slight amount, in a direction opposite to the direction of the movement of the armature assembly. The movement of the armature assemblies in two directions, as well as the counter directional movements of the stator and frame give rise to vibrations within the casing. However, since the stator assembly is spaced from the casing walls, rather than being secured thereto, and is permitted to move with respect to the casing the vibrations are not readily transmitted through the casing of the user's hands. Additionally, spring 90 serves to prevent contact of the stator assembly with the casing walls when the casing is held in a position other than that shown in the drawings, as for example when the casing is turned on its side, in shaving use. Although spring 90 couples some energy into casing 10 because of its contact with the latter, it is designed and held to the lowest possible spring rate to minimize vibrational transfers. The spring is further designed so that the spring rate rises sharply at its curved ends 94 to prevent an unpleasant impact when the shaver is shaken by the hand at high accelerations.

Figure 3:
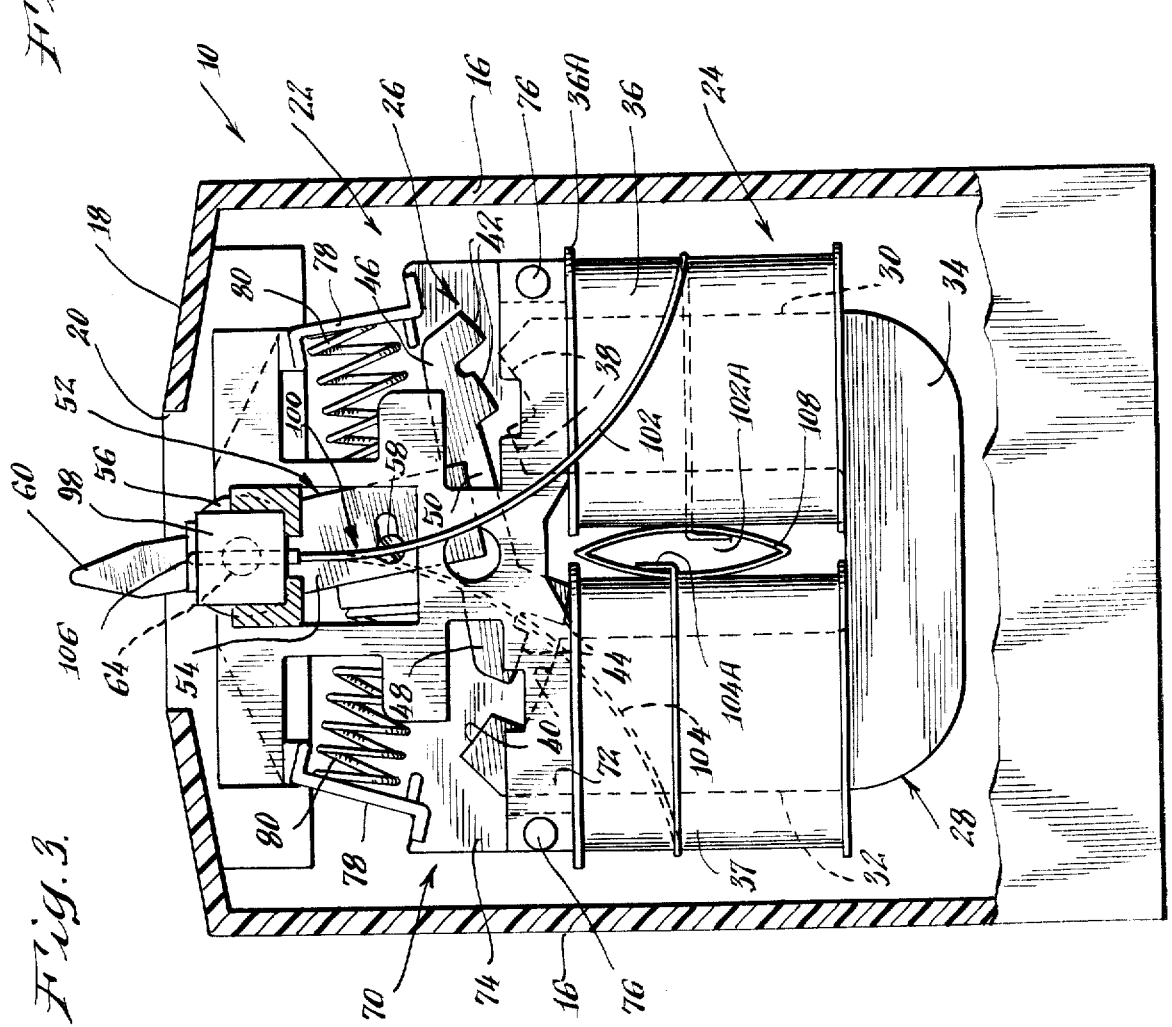
FIG. 3 is a front elevational view, partly in section, of the portable electrical appliance which includes a second embodiment of the novel vibratory motor arrangement of the present invention.

The second embodiment of the invention is shown in FIGS. 3 and 4, wherein the stator and frame assemblies also are suspended from pivot shaft 64 but the ends of the shaft are free to rotate within bearing inserts 98 (FIG. 4) on the front and rear casing walls 12 and 14. A transfer spring means 100 is provided in casing 10 and includes wire elements 102 and 104 each having an end 106 secured within a respective insert 98. As better seen in FIG. 3, wire element 102 extends downwardly from insert 98, then curves to the right to pass in front of coil 36 disposed on leg 30. Wire element 102 then is turned to firmly engage the side of coil 36 adjacent sidewall 16 and extends toward rear wall 14 where it again turns to engage the side of coil 36, adjacent to rear wall 14. Wire 102 changes direction again to extend between the coils 36 and 37 and to enter an insulated sleeve 108, to press against coil 36 and to terminate in a down-turned end 102A. In like manner, wire element 104 extends downwardly from insert 98 on rear wall 14, where it curves to the left (as seen in FIG. 3) towards sidewall 16. Wire element 104 engages the side of coil 37, adjacent sidewall 16, where it again turns to engage the side of coil 37 adjacent front wall 12. Wire element 104 then turns to enter insulator sleeve 108 to terminate in an upturned end 104A.

Wire elements 102 and 104 are relatively stiff, but resilient, and are constructed and arranged to exert a biasing force principally in a direction towards an imaginary vertical line extending through inserts 98 and in the space between legs 30 and 32 of the core 28. Thus as seen in FIG. 3, the wire elements 102 and 104 in embracing their respective coils 36 and 37 tend to urge the coils in opposite directions and towards each other.

In the operation of the embodiment shown in FIGS. 3 and 4, let it be assumed that when the coils are energized, armature 50 first moves toward the left as seen in FIG. 3. This induces a couple which will tend to cause pivotal movement of the stator assembly 24 about pivot shaft 64 with respect to the casing and in an opposite direction. Movement of the stator assembly is restrained by wire element 102 because of its biasing force in the other direction. The force exerted by the wire 102 tends to move the stator assembly beyond its centralized position, but this in turn is resisted by wire element 104 acting in the opposite direction. Upon movement of armature 50 towards the right, as seen in FIG. 3, the stator assembly 24 would be caused to move in the opposite direction and about pivot shaft 64. As described above in connection with spring 102, spring 104 becomes effective to restrain movement of the stator assembly and return the latter to its centralized position, beyond which it would be restrained by the wire element 102.

In effect, the wire element arrangement provides a balancing system wherein the unbalancing moments which are generated in the operation of motor 22 are transfered by elements 102 and 104 back to the pivot axis of the system at inserts 98, to cause such moments to be canceled out. Furthermore, the unique arrangement of the wire elements 102 and 104 maintains the stator assembly 24 in a centralized position, whereby a change in position of casing 10, as on its side, will not cause the stator to move from the position shown on the drawing to contact the casing side walls 16. As a result, means such as spring 90 in the first embodiment is not required so that no energy is coupled into the casing by reason of a spring in contact with the wall and the stator.

It will be apparent from the foregoing description that a novel motorized portable electrical appliance is provided, wherein the suspension of the motor about a single pivot axis out of contact with the casing reduces the magnitude of undesirable vibrations transmitted to the hands of the user. The invention further provides a novel spring suspension system which collects and translates unbalancing moments to the pivot axis to effect cancellation thereof.

Although two embodiments of the invention have been illustrated and described in detail it is to be expressly understood that the invention is not limited thereto. Various changes can be made in the design and arrangements of the parts without departing from the spirit and scope of the invention as the same will now be understood by those skilled in the art.

What is claimed is:

1. A portable hand-held electrical appliance comprising, a casing, a vibratory motor in the casing having a stator and an armature, said armature being pivotly mounted with respect to the stator, a frame carrying the stator, and pivot means in said casing for suspending said motor within and spaced from the casing as well as providing for pivotal movement of the armature, said pivot means being the sole support for the motor within the casing and permitting pivotal movement of the motor with respect to the casing upon energization thereof.

2. The appliance of claim 1 in which the pivot axis for the armature and for the frame are coincident.

3. The appliance of claim 1 wherein the pivot means includes a shaft having its ends rotatably carried by the casing and having the armature secured thereto but the frame freely movable thereon.

4. The appliance of claim 1 wherein spring means are carried by the stator to lightly bear against the casing to maintain the stator spaced from the walls of the casing.

5. The appliance of claim 4 wherein the appliance is a dry shaver with cutters, and the pivot means is disposed at one end of the casing adjacent the cutters and the spring means is disposed adjacent the other end of the casing.

6. The appliance of claim 1 wherein means are provided to transfer unbalancing moments caused by movement of the armature to transmit same to the pivot means to thereby cancel said moments.

7. The appliance of claim 6 wherein said transfer means includes wire elements which embrace the stator and have ends secured adjacent said pivot means.

8. The appliance of claim 6 wherein said transfer means opposes movement of the stator in either direction about the pivot means but permits movement of the armature with respect to the stator.

9. A portable hand-held electrical appliance comprising, a casing, a vibratory motor in the casing having a stator and an armature, said armature being pivotly mounted with respect to the stator, a frame carrying the stator, and a pivot means in said casing for suspending said motor within and spaced from the casing, said pivot means being the sole support for the motor within the casing and permitting pivotal movement of the motor with respect to the casing upon energization thereof, said pivot means also provides pivotal movement of the armature, wherein means are provided to transfer unbalancing moments caused by movement of the armature to transmit same to the pivot means to thereby cancel said moments, said transfer means includes wire elements which embrace the stator and have ends secured adjacent said pivot means, said wire elements include two resilient wire elements, one of said elements having an end secured adjacent the pivot means, adjacent a wall of the casing and a portion engaging one side of the stator to urge the latter in one direction, and the other wire element having an end secured adjacent the pivot means near an opposite wall of the casing and having a part engaging an opposite side of the stator for urging the latter in a direction opposite to the direction in which the stator is urged by the portion of said one element.

* * * * *